(12) United States Patent
Goodson

(10) Patent No.: US 10,328,757 B1
(45) Date of Patent: Jun. 25, 2019

(54) CHAIN APPARATUS FOR USE WITH A VEHICULAR TIRE TO ENHANCE TRACTION ON SLIPPERY TERRAIN

(71) Applicant: Robert Edward Goodson, Aurora, CO (US)

(72) Inventor: Robert Edward Goodson, Aurora, CO (US)

( * ) Notice: Subject to any disclaimer, the term of this patent is extended or adjusted under 35 U.S.C. 154(b) by 98 days.

(21) Appl. No.: 15/479,185

(22) Filed: Apr. 4, 2017

Related U.S. Application Data

(60) Provisional application No. 62/390,636, filed on Apr. 5, 2016.

(51) Int. Cl.
*B60C 27/02* (2006.01)

(52) U.S. Cl.
CPC ........ *B60C 27/0276* (2013.01); *B60C 27/023* (2013.01); *B60C 27/0215* (2013.01); *B60C 27/0223* (2013.01); *B60C 27/0246* (2013.01); *B60C 27/0284* (2013.01)

(58) Field of Classification Search
CPC . B60C 27/02; B60C 27/0207; B60C 27/0215; B60C 27/0223; B60C 27/023; B60C 27/0238; B60C 27/0246; B60C 27/0261; B60C 27/0269; B60C 27/0276; B60C 27/0284; B60C 27/0292; B60C 27/04; B60C 27/045
See application file for complete search history.

(56) References Cited

U.S. PATENT DOCUMENTS

| | | | | |
|---|---|---|---|---|
| 1,350,484 A | * | 8/1920 | Bailey | B60C 27/08 152/221 |
| 2,058,799 A | * | 10/1936 | Jacks | B60C 27/16 152/221 |
| 2,280,555 A | * | 4/1942 | Sterner | B60C 27/08 152/228 |
| 2,514,243 A | * | 7/1950 | Iandiorio | B60C 27/02 152/222 |
| 2,693,838 A | * | 11/1954 | Dandurand | B60C 27/12 152/225 R |
| 4,366,850 A | * | 1/1983 | Coutts | B60C 27/06 152/222 |
| 4,836,259 A | * | 6/1989 | Lewin | B60C 27/02 152/222 |
| 6,591,882 B1 | * | 7/2003 | Clark | B60C 27/06 152/213 R |

(Continued)

*Primary Examiner* — Kip T Kotter

(57) ABSTRACT

A detachable chain apparatus for use with a vehicular tire is provided. The chain apparatus includes a plurality of chain assemblies disposed on the vehicular tire, each chain assembly having an elongated cable extending through a pair of slider members to create a first end loop portion proximate the first slider member, a second end loop portion proximate the second slider member, and an intermediate parallel cable portion of the elongated cable between the pair of slider members disposed on a tread portion of the vehicular tire, a plurality of sleeves rotatably mounted to the intermediate parallel cable portion of the elongated cable, and an elastic strap coupled to both the first and second end loop portions of the elongated cable. Tension in the elastic strap secures both the first and second end loop portions of the elongated cable within an interior of the tire.

6 Claims, 4 Drawing Sheets

(56) References Cited

U.S. PATENT DOCUMENTS

2005/0028913 A1* 2/2005 Clark .................. B60C 27/06
 152/221
2011/0017371 A1* 1/2011 Rose .................. B60C 27/16
 152/187

* cited by examiner

CHAIN APPARATUS FOR USE WITH A VEHICULAR TIRE TO ENHANCE TRACTION ON SLIPPERY TERRAIN

RELATED APPLICATION

The application claims priority to provisional patent application U.S. Ser. No. 62/390,636 filed on Apr. 5, 2016, the entire contents of which is herein incorporated by reference.

BACKGROUND

The embodiments herein relate generally to snow chains attached to tires of a vehicle.

Individuals often secure snow chains to tires of their vehicles in locations where significant snow accumulations occur. Traditional snow chain assemblies comprise chain links or cables that are disposed over the tread of a tire and secured in place by straps or cords.

These traditional snow chain assemblies have several disadvantages. First, the snow chain assemblies are time-consuming and a burden to install on the tire. Typically, the assembly is disposed flat on the ground to permit the vehicle's tire to drive over. Next, the user has to reach around the tire in small spaces to secure the snow chain assembly in place by straps or cords. Second, the snow chain assemblies generally comprise bulky chains that can loosen and clump together at the wheel well. This causes noise, vibrations and/or damage to the vehicle's wheel wells and/or tires when the vehicle is in motion. To prevent the occurrence of loose snow chain assemblies on tires, these assemblies have a limited safe operating speed on tires up to approximately 25 miles per hour.

As such, there is a need in the industry for a chain apparatus for use with a vehicular tire that addresses the limitations of the prior art, which enhances traction of the tire on slippery terrain such as snow. There is a further need for the chain apparatus to attach to or detach from the tire with enhanced efficiency. There is a further need for the chain apparatus to enhance the safe operating speed of the tire when the chain apparatus is installed thereon.

SUMMARY

A detachable chain apparatus for use with a vehicular tire to enhance traction of the tire on slippery terrain is provided. The chain apparatus is configured to improve the safe operating speed of the tire with the chain apparatus secured thereon. The vehicular tire comprises a rim coupled to a central opening of the tire and comprising a plurality of openings.

The chain apparatus comprises a plurality of chain assemblies disposed on the vehicular tire, each chain assembly in the plurality of chain assemblies comprising an elongated cable extending through a pair of slider members to create a first end loop portion of the elongated cable proximate the first slider member, a second end loop portion of the elongated cable proximate the second slider member, and an intermediate parallel cable portion of the elongated cable between the pair of slider members disposed on a tread portion of the vehicular tire, a plurality of sleeves rotatably mounted to the intermediate parallel cable portion of the elongated cable, and an elastic strap comprising a first end coupled to the first end loop portion of the elongated cable and a second end coupled to the second end loop portion of the elongated cable, wherein the first end loop portion of the elongated cable is configured to extend through one of the plurality of openings in the rim to enable tension in the elastic strap to secure both the first and second end loop portions of the elongated cable within an interior of the tire, thereby permitting the plurality of sleeves to enhance traction of the tire upon contact with the slippery terrain.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
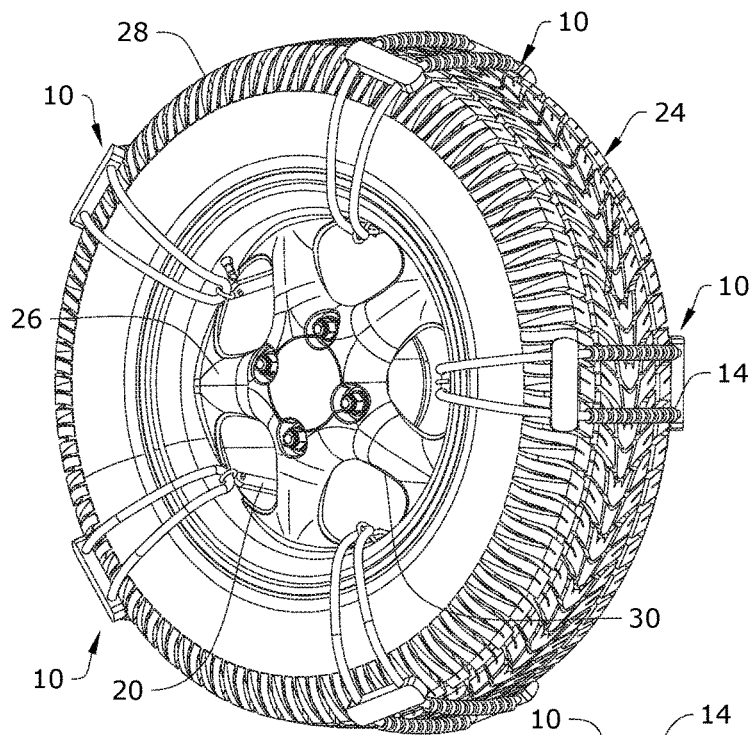
FIG. 1 depicts a perspective view of certain embodiments of the chain apparatus shown in use.
Figure 2:
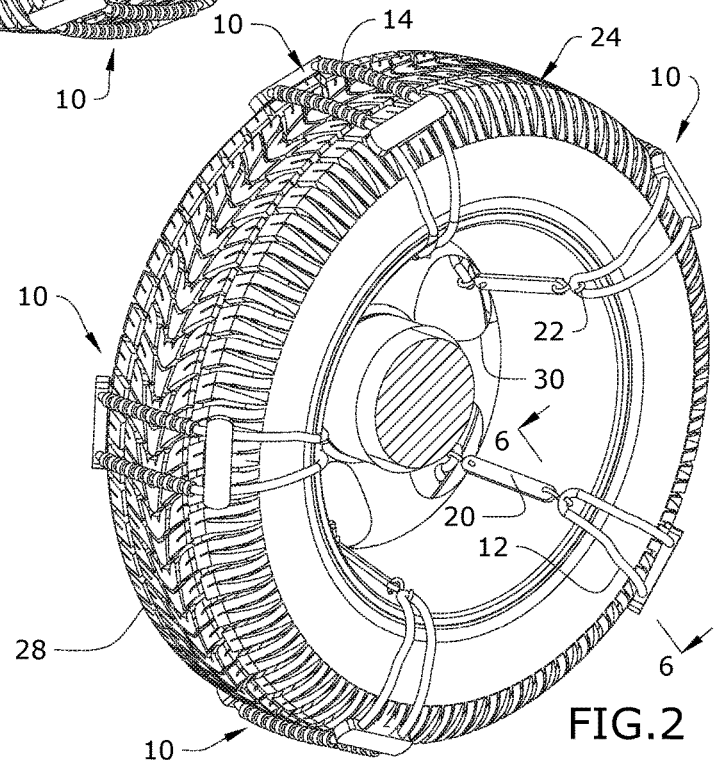
FIG. 2 depicts a perspective view of certain embodiments of the chain apparatus shown in use.
Figure 3:
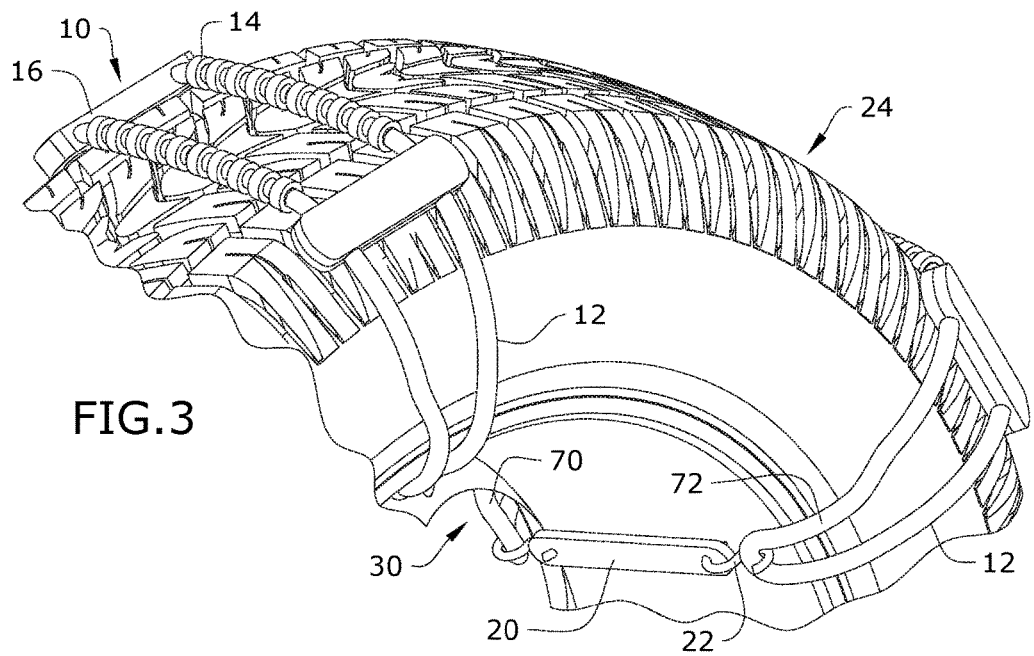
FIG. 3 depicts a perspective view of certain embodiments of the chain apparatus shown in use.

As depicted in FIGS. 1-5, the chain apparatus comprises a plurality of chain assemblies 10 disposed on tire tread 28 and secured in place on tire 24. Tire 24 comprises rim 26, which is coupled thereto. Rim 26 may have any number of openings 30. The chain apparatus is configured to enhance the traction of tire 24 on slippery terrain such as snow 32. However, the chain apparatus may be effective on other surfaces such as sand, loose gravel, rocks, and the like.

In a preferred embodiment, chain assemblies 10 are generally evenly spaced along the circumference of tire 24. Although the figures depict five chain assemblies 10 coupled to tire 24, any alternative number of chain assemblies 10 may be used instead. In certain embodiments of the invention, each chain assembly 10 generally comprises cable 12, sleeves 14, sliders 16 and bungee strap 20.

Figure 4:
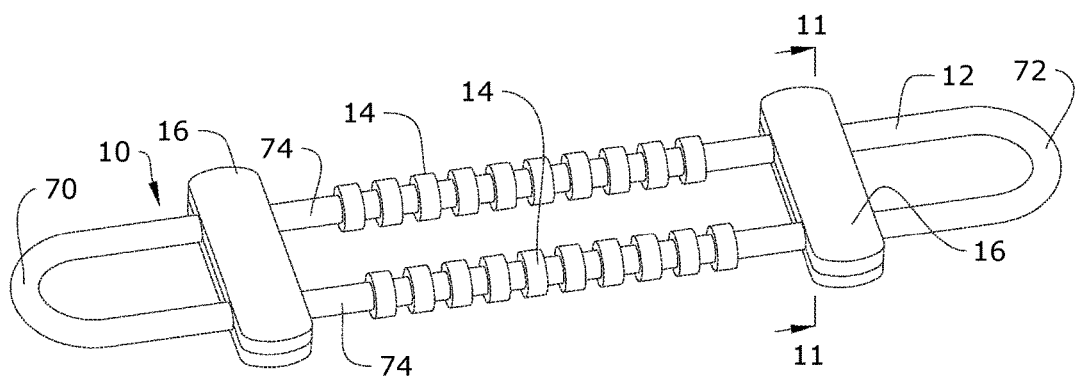
FIG. 4 depicts a perspective view of certain embodiments of the chain apparatus.
Figure 5:
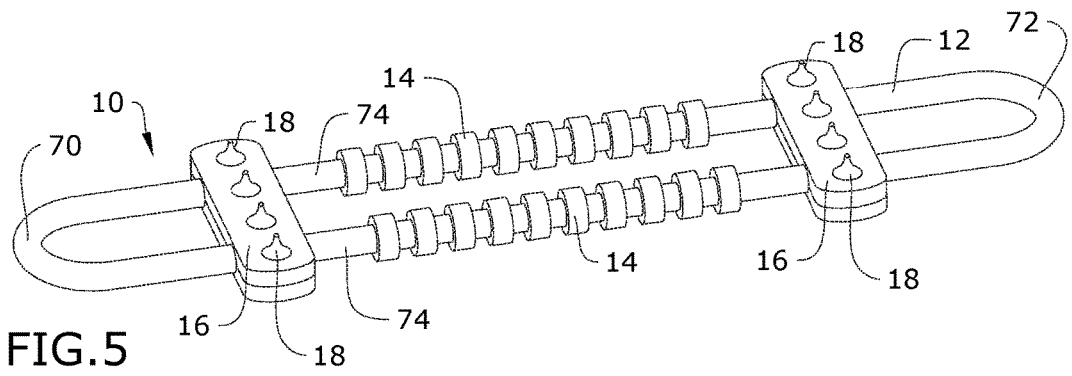
FIG. 5 depicts a perspective view of certain embodiments of the chain apparatus.

As depicted in FIGS. 4-5, cable 12 is an elongated cable preferably made from aluminum, steel, other metal or combinations of materials. Cable 12 is bent to extend through a pair of sliders 16 to form first end loop portion 70 proximate a first slider 16, second end loop portion 72 proximate a second slider 16, and intermediate parallel cable portion 74 between the pair of sliders 16. A plurality of sleeves 14 are rotatably mounted to intermediate parallel cable portion 74 of cable 12. Sleeves 14 are cylindrical members preferably made from metal such as steel or alternative material.

Figure 11:
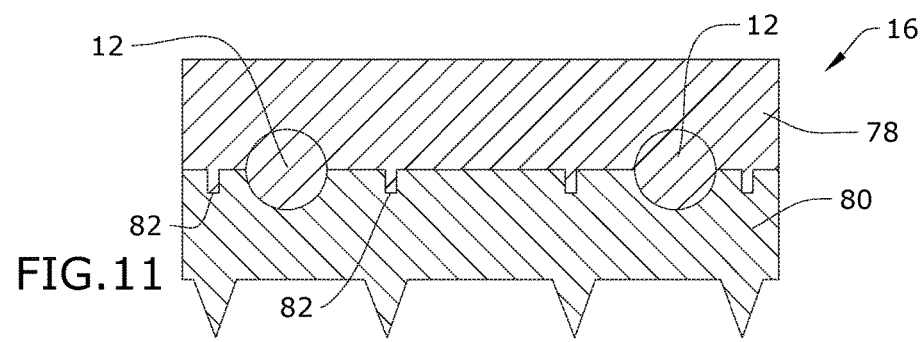
FIG. 11 depicts a section view of certain embodiments of the chain apparatus taken along line 11-11 in FIG. 4.

As depicted in FIG. 11, each slider 16 comprises a pair of openings configured to receive cable 12 therethrough. In certain embodiments, slider 16 comprises upper casing 78 detachably coupled to lower casing 80 by snap connectors 82. In an alternative embodiment, slider 16 may be a single and continuous component comprising the pair of openings to receive cable 12. In a preferred embodiment, sliders 16 are made from metal, hard plastic, or other type of durable material known in the field.

Figure 6:
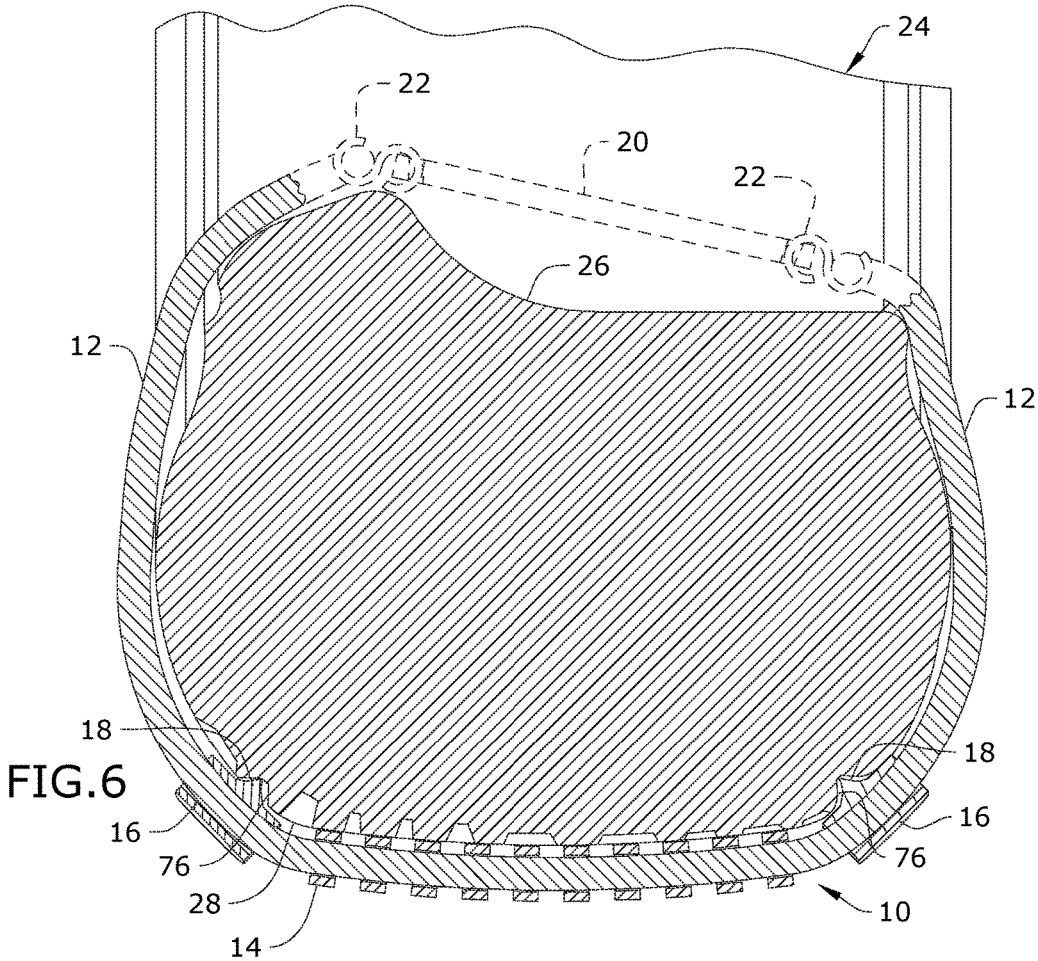
FIG. 6 depicts a section view of certain embodiments of the chain apparatus taken along line 6-6 in FIG. 2.

As depicted in FIGS. 5 and 11, lower casing 80 comprises a plurality of pins 18 that extend outward an approximate length of 2/32" or less. As depicted in FIG. 6, each pin 18 is configured to extend within tire groove 76 of tire tread 28. This prevents chain assembly 10 from sliding off tire tread 28 when the assembly is secured to tire 24. It shall be appreciated that any pin 18 comprising a length greater than 2/32" may puncture into tire 24. Sliders 16 are configured to slidably adjust along cable 12 to permit pins 18 to extend into any desired tire grooves 76.

In operation, the chain apparatus is coupled to tire 24 as shown in FIGS. 1-3 and 6. Each chain assembly 10 is secured to tire 24 by inserting pins 18 of sliders 16 into tire grooves 76 of tire tread 28. First end loop portion 70 and second end loop portion 72 of cable 12 are wrapped around the side walls of tire 24 and connected together by bungee strap 20. Specifically, bungee strap 20 is connected to first and second end loop portions 70, 72 by S-hooks 22. In this assembly, first end loop portion 70 extends through any opening 30 in tire rim 26.

Figure 7:
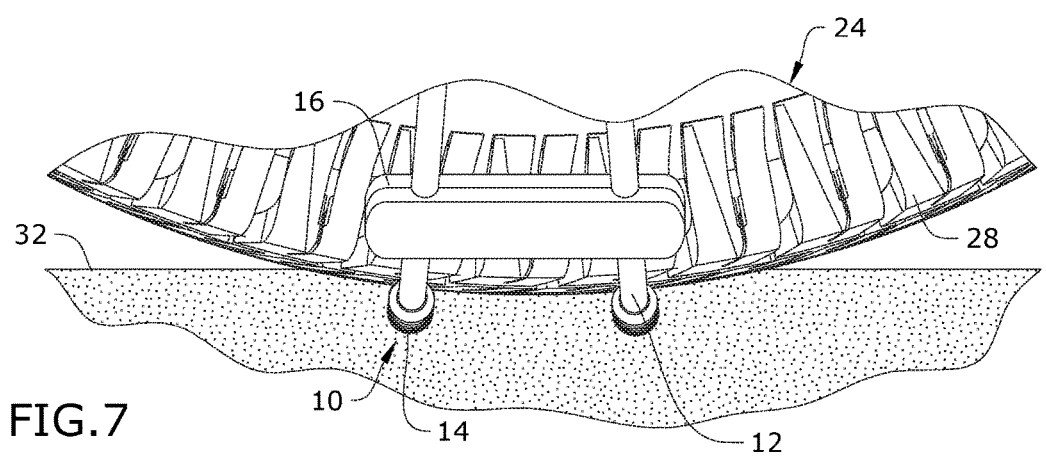
FIG. 7 depicts a section view of certain embodiments of the chain apparatus.

Bungee strap 20 is preferably made from an elastic rubber material configured to provide sufficient tension to maintain first and second end loop portions 70, 72 within the interior of tire 24. The installation of the chain apparatus to tire 24 enhances traction of the tire in slippery terrain. This is illustrated in FIG. 7 where the rotation of tire 24 permits sleeves 14 of each chain assembly 10 to dig underneath snow 32.

Figure 8:
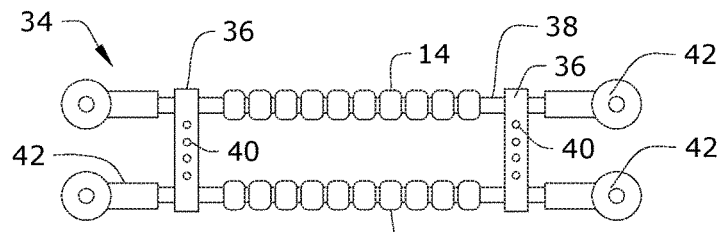
FIG. 8 depicts a top view of an alternate embodiment of the chain apparatus.
Figure 9:
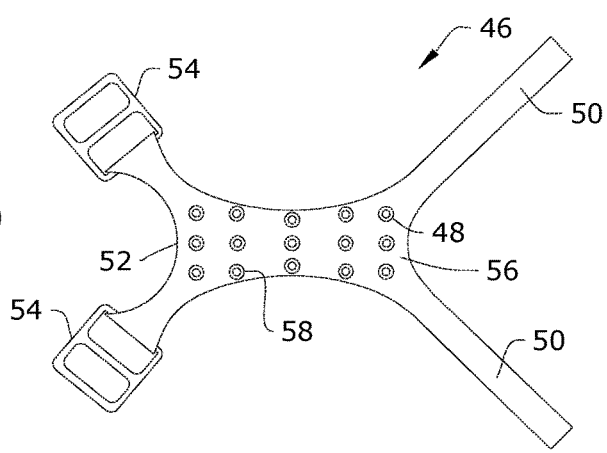
FIG. 9 depicts a top view of an alternate embodiment of the chain apparatus.
Figure 10:
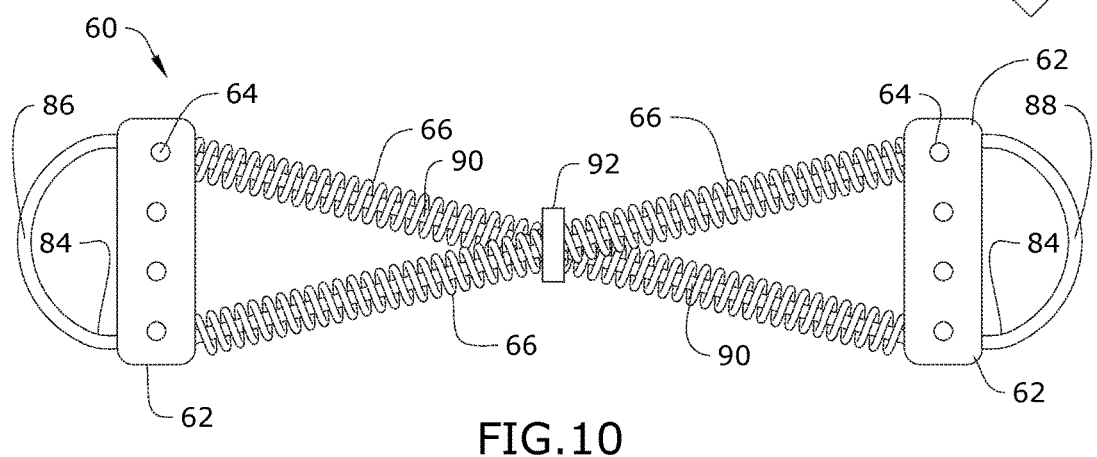
FIG. 10 depicts a top view of an alternate embodiment of the chain apparatus.

FIGS. 8-10 depict various alternative embodiments of the chain apparatus. As depicted in FIG. 8, first alternate chain assembly 34 comprises several components substantially similar to chain assembly 10. In certain embodiments, first alternate chain assembly 34 comprises a pair of alternate cables 38 disposed through alternate sliders 36, which comprise alternate pins 40. Alternate sleeves 44 are rotatably mounted to the pair of alternate cables 38. The ends of alternate cables 38 comprise end members 42. In operation, first alternate chain assembly 34 is disposed on tire 24. End members 42 of the pair of alternate cables 38 are wrapped around the side walls of tire 24 and connected within the interior of tire 24 by four S-hooks 22 and a pair of bungee straps 20 (not shown).

As depicted in FIG. 9, second alternate chain assembly 46 comprises first end portion 52 comprising a pair of buckle clips 54 and a second end portion 56 comprising a pair of straps 50. The central portion of second alternate chain assembly 46 comprises a plurality of stud holders 48 and studs 58 positioned on tire tread 28 of tire 24. In operation, second alternate chain assembly 46 is disposed on tire 24. The pair of straps 50 are inserted through openings 30 in tire rim 26 and coupled to the pair of buckle clips 54 within the interior of the tire (not shown). In one embodiment, each strap 50 comprises hook and loop fasteners to permit the strap to be coupled to itself.

As depicted in FIG. 10, third alternate chain assembly 60 comprises several components substantially similar to chain assembly 10. In certain embodiments, third alternate chain assembly 60 comprises alternate cable 84, alternate sliders 62, alternate pins 64 and coil springs 66. Alternate cable 84 is preferably an elongated polypropylene rope. Alternate cable 84 is bent to extend through the pair of alternate sliders 62 to form first end loop portion 86 proximate a first alternate slider 62, second end loop portion 88 proximate a second alternate slider 62, and intermediate crossing cable portion 90 between the pair of alternate sliders 62. The intersection of intermediate crossing cable portion 90 is enclosed within center housing 92. Four coiled springs 66 preferably made from metal are disposed around alternate cable 84 at intermediate crossing cable portion 90.

In operation, third alternate chain assembly 60 is secured to tire 24 in the same manner chain assembly 10 is secured to tire 24 described above. Coiled springs 66 extend on top of tire tread 28 of tire 24. First and second end loop portions 86, 88 are wrapped around the side walls of tire 24 and secured together within the interior of the tire by bungee strap 20 and S-hooks 22. Coiled springs 66 protect alternate cable 84 and enhance traction of tire 24 by digging underneath snow 32.

It shall be appreciated that the components of the chain apparatuses described in several embodiments herein may comprise any alternative known materials in the field and be of any color, size and/or dimensions. It shall be appreciated that the components of the chain apparatuses described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A detachable chain apparatus for use with a vehicular tire to enhance traction of the tire on slippery terrain, the chain apparatus configured to improve the safe operating speed of the tire with the chain apparatus secured thereon, a rim coupled to a central opening of the tire and the rim comprising a plurality of openings, the chain apparatus comprising:

a plurality of chain assemblies disposed on the vehicular tire, each chain assembly in the plurality of chain assemblies comprising:
an elongated cable extending through a pair of slider members to create a first end loop portion of the elongated cable proximate the first slider member, a second end loop portion of the elongated cable proximate the second slider member, and an intermediate parallel cable portion of the elongated cable between the pair of slider members disposed on a tread portion of the vehicular tire wherein each slider member of the plurality of slider members is slidably mounted to the elongated cable and comprises an upper casing and a lower casing;
a plurality of sleeves rotatably mounted to the intermediate parallel cable portion of the elongated cable; and
an elastic strap comprising a first end coupled to the first end loop portion of the elongated cable and a second end coupled to the second end loop portion of the elongated cable wherein the first end of the elastic strap is coupled to the first end loop portion by a first S-hook and the second end of the elastic strap is coupled to the second end loop portion by a second S-hook;
wherein the first end loop portion of the elongated cable is configured to extend to one of the plurality of openings in the rim to enable tension in the elastic strap to secure both the first and second end loop portions of the elongated cable within an interior of the tire, thereby permitting the plurality of sleeves to enhance traction of the tire upon contact with the slippery terrain.

2. The detachable chain apparatus of claim 1, wherein the lower casing of each slider member comprises a plurality of pins configured to extend within a groove in the tread position of the tire.

3. The detachable chain apparatus of claim 2, wherein the upper and lower casings of the slider member are detachably coupled to each other.

4. A detachable chain apparatus for use with a vehicular tire to enhance traction of the tire on slippery terrain, the chain apparatus configured to improve the safe operating speed of the tire with the chain apparatus secured thereon, a rim coupled to a central opening of the tire and the rim comprising a plurality of openings, the chain apparatus comprising:

a plurality of chain assemblies disposed on the vehicular tire, each chain assembly in the plurality of chain assemblies comprising:

an elongated cable extending through a pair of slider members to create a first end loop portion of the elongated cable proximate the first slider member, a second end loop portion of the elongated cable proximate the second slider member, and an intermediate crossing cable portion of the elongated cable between the pair of slider members disposed on a tread portion of the vehicular tire wherein each slider member of the plurality of slider members is slidably mounted to the elongated cable and comprises an upper casing and a lower casing;

a plurality of springs mounted to the intermediate crossing cable portion of the elongated cable; and an elastic strap comprising a first end coupled to the first end loop portion of the elongated cable and a second end coupled to the second end loop portion of the elongated cable wherein the first end of the elastic strap is coupled to the first end loop portion by a first S-hook and the second end of the elastic strap is coupled to the second end loop portion by a second S-hook;

wherein the first end loop portion of the elongated cable is configured to extend to one of the plurality of openings in the rim to enable tension in the elastic strap to secure both the first and second end loop portions of the elongated cable within an interior of the tire, thereby permitting the plurality of sleeves to enhance traction of the tire upon contact with the slippery terrain.

5. The detachable chain apparatus of claim 4, wherein the lower casing of each slider member comprises a plurality of pins configured to extend within a groove in the tread portion of the tire.

6. The detachable chain apparatus of claim 5, wherein the upper and lower casings of the slider member are detachably coupled to each other.

\* \* \* \* \*